US010410450B1

(12) United States Patent
DeLong et al.

(10) Patent No.: US 10,410,450 B1
(45) Date of Patent: Sep. 10, 2019

(54) WIRELESS BACKSCATTER WITH TIME-OF-FLIGHT FOR VEHICLE COMMUNICATION

(71) Applicant: Ford Global Technologies, LLC, Dearborn, MI (US)

(72) Inventors: Aaron Matthew DeLong, Toledo, OH (US); Vivekanandh Elangovan, Canton, MI (US); Ali Hassani, Ann Arbor, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/020,216

(22) Filed: Jun. 27, 2018

(51) Int. Cl.
| | |
|---|---|
| *G07C 9/00* | (2006.01) |
| *B60R 25/24* | (2013.01) |
| *B60C 23/02* | (2006.01) |
| *G01S 13/76* | (2006.01) |
| *G01S 13/75* | (2006.01) |

(52) U.S. Cl.
CPC .......... *G07C 9/00309* (2013.01); *B60C 23/02* (2013.01); *B60R 25/24* (2013.01); *G01S 13/75* (2013.01); *G01S 13/765* (2013.01); *G07C 2009/00547* (2013.01); *G07C 2009/00793* (2013.01); *G07C 2009/00984* (2013.01); *G07C 2209/63* (2013.01)

(58) Field of Classification Search
CPC ............................ G07C 9/00309; G01S 13/75
USPC ........................................................ 340/5.7
See application file for complete search history.

(56) References Cited

U.S. PATENT DOCUMENTS

| | | | |
|---|---|---|---|
| 8,930,045 B2 | 1/2015 | Oman et al. | |
| 9,566,945 B2 | 2/2017 | Ghabra et al. | |
| 2004/0135670 A1* | 7/2004 | Guba | B60R 25/24 340/5.21 |
| 2005/0024181 A1* | 2/2005 | Hofbeck | B60R 25/02 340/5.7 |
| 2005/0258936 A1* | 11/2005 | Ghabra | B60R 25/245 340/5.72 |
| 2010/0207754 A1* | 8/2010 | Shostak | B60C 23/041 340/450 |

(Continued)

FOREIGN PATENT DOCUMENTS

| | | | |
|---|---|---|---|
| WO | WO 2005088561 A2 | 9/2005 | |
| WO | WO 2005114593 A1 | 12/2005 | |

OTHER PUBLICATIONS

Srdjan Capkun, *Relay Attacks on Passive Keyless Entry and Start Systems in Modern Cars*, May 2011, 40 pages.

*Primary Examiner* — Vernal U Brown
(74) *Attorney, Agent, or Firm* — Frank Lollo; Neal, Gerber & Eisenberg LLP; James P. Muraff

(57) ABSTRACT

Method and apparatus are disclosed for wireless backscatter with time-of-flight for vehicle communication. An example vehicle includes a communication module for Wi-Fi communication and a controller. The controller is to send a signal via the communication module upon identifying a passive-entry passive-start (PEPS) request and receive a backscatter signal from an electronic device. The backscatter signal is a reflection of the signal. The controller also is to determine a distance to the electronic device based upon the backscatter signal and perform the PEPS request upon determining the distance corresponds with the PEPS request.

16 Claims, 8 Drawing Sheets

(56) References Cited

U.S. PATENT DOCUMENTS

| | | | |
|---|---|---|---|
| 2015/0091706 A1* | 4/2015 | Chemishkian | G06K 7/10158 340/10.34 |
| 2015/0208207 A1 | 7/2015 | Ye et al. | |
| 2016/0320469 A1* | 11/2016 | Laifenfeld | G01S 5/14 |
| 2018/0007507 A1 | 1/2018 | Ghabra et al. | |

* cited by examiner

WIRELESS BACKSCATTER WITH TIME-OF-FLIGHT FOR VEHICLE COMMUNICATION

TECHNICAL FIELD

The present disclosure generally relates to vehicle communication and, more specifically, to wireless backscatter with time-of-flight for vehicle communication.

BACKGROUND

Typically, keys are utilized to unlock doors of a vehicle and to activate an engine of the vehicle. Traditionally, mechanical keys have been utilized to unlock vehicle doors and to activate ignition of vehicle engines. For instance, a mechanical key is inserted into a keyhole and rotated to unlock a door and/or to start an engine. Recently, key fobs have been utilized to unlock vehicle doors and to activate vehicle engines. For instance, key fobs wirelessly communicate with vehicles to unlock vehicle doors and/or to activate ignition of engines.

Further, some recent vehicles have implemented tire pressure monitoring systems (TPMS) that monitor tire pressures and/or other characteristics of the tires. For instance, a vehicle may include a pressure sensor for each tire of the vehicle to enable each of the tires to be monitored on behalf of an operator of the vehicle. The pressure sensors wirelessly communicate the pressure measurements of the tires to a processor of the vehicle for analysis and/or display.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for wireless backscatter with time-of-flight for vehicle communication. An example disclosed vehicle includes a communication module for Wi-Fi communication and a controller. The controller is to send a signal via the communication module upon identifying a passive-entry passive-start (PEPS) request and receive a backscatter signal from an electronic device. The backscatter signal is a reflection of the signal. The controller also is to determine a distance to the electronic device based upon the backscatter signal and perform the PEPS request upon determining the distance corresponds with the PEPS request.

An example disclosed system includes a vehicle. The vehicle includes a communication module to send a Wi-Fi signal and LF signals upon identifying an access request. The communication module also is to receive a backscatter signal that is a modified reflection of the Wi-Fi signal and includes signal strengths of the LF signals. The vehicle also includes a controller to determine a location of an electronic device based upon the signal strengths and enable access responsive to the location corresponding with the access request.

An example disclosed vehicle includes tires, tire pressure monitoring system (TPMS) sensors to collect pressure measurements of the tires, a communication module for Wi-Fi communication, and a controller. The controller is to send signals via the communication module to the TPMS sensors and receive backscatter signals from the TPMS sensors that are modified reflections of the signals and include the pressure measurements. The TPMS sensors modulate the signals to include the pressure measurements in the backscatter signals.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
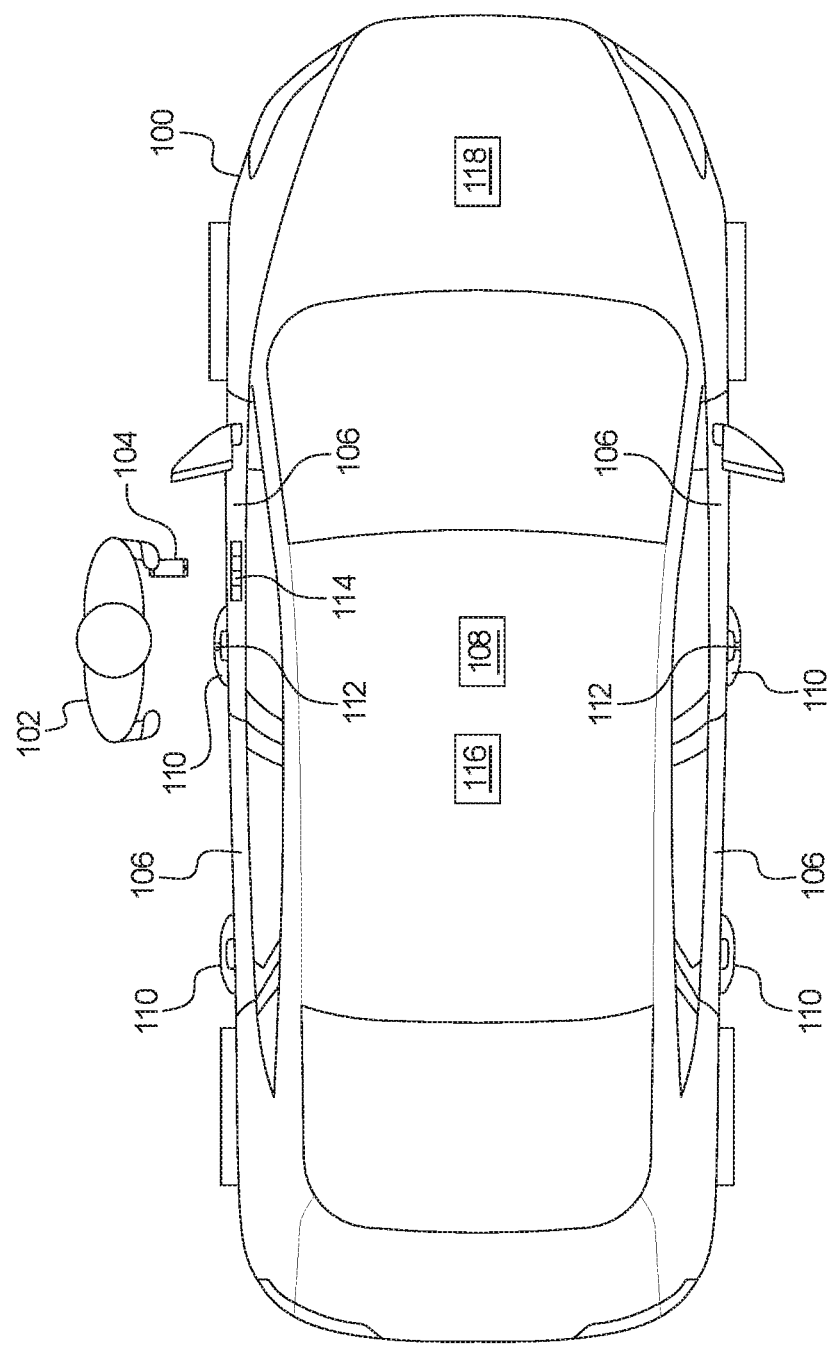
FIG. 1A illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, keys are utilized to unlock doors of a vehicle and to activate an engine of the vehicle. Traditionally, mechanical keys have been utilized to unlock vehicle doors and to activate ignition of vehicle engines. For instance, a mechanical key is inserted into a keyhole and rotated to unlock a door and/or to start an engine. Recently, key fobs have been utilized to unlock vehicle doors and to activate vehicle engines. For instance, key fobs wirelessly communicate with vehicles to unlock vehicle doors and/or to activate ignition of engines.

In such instances, a vehicle may perform a vehicle function (e.g., unlock a door, start an engine) in response to (1) receiving a request from the user and (2) detecting that a recognized key fob is near the vehicle. Recently, criminals have performed relay attacks on wireless communication between key fobs and vehicles that potentially trick a vehicle into performing a vehicle function by making it appear that a key fob is closer to the vehicle than it actually is. For instance, a relay attack may be performed by a device that (1) intercepts communication signals sent from a vehicle to a mobile device and (2) amplifies the intercepted communication signals to make the mobile device appear closer to the vehicle than it actually is. Example methods and apparatus disclosed herein utilize a time-of-flight of Wi-Fi backscatter communication between a key fob and a vehicle when identifying a distance to and/or a location of the key fob to protect the vehicle against such relay attacks.

Further, some recent vehicles have implemented tire pressure monitoring systems (TPMS) that monitor tire pressures and/or other characteristics of the tires. For instance, a vehicle may include a pressure sensor for each tire of the vehicle to enable each of the tires to be monitored on behalf of an operator of the vehicle. The pressure sensors wirelessly communicate the pressure measurements of the tires to a processor of the vehicle for analysis and/or display. In some instances, the pressure sensors are configured to collect pressure measurements in a scheduled manner without input from an operator of the vehicle. For instance, the pressure sensors may be configured to collect pressure measurements at a first rate when the vehicle is in motion and configured to collect pressure measurements at a slower rate when the vehicle is stationary. Such configurations of pressure sensors potentially collect pressure measurements in an energy inefficient manner and/or are unable to collect pressure measurements in an on-demand manner as requested by the operator. Example methods and apparatus disclosed herein utilize a time-of-flight of Wi-Fi backscatter communication between pressure sensors and communication module(s) of a vehicle when collecting tire pressure measurements to (1) enable the pressure measurements to be collected in an energy efficient manner and (2) enable the pressure measurements to be collected on-demand by an operator.

Examples disclosed herein include a vehicle system that utilizes wideband Wi-Fi backscatter to communicate between a key fob and a vehicle. Wideband Wi-Fi backscatter (e.g., Wi-Fi communication utilizing a channel bandwidth of at least 80 MHz) allows for robust and accurate time-of-flight measurements relative to narrowband Wi-Fi and/or other wireless communication. In some examples, the vehicle system collects time-of-flight measurements based on backscatter of wideband Wi-Fi communication to determine a distance between the key fob and the vehicle to (i) protect against relay attacks and/or (ii) detect a location of the key fob for passive-entry passive-start. In some examples, the vehicle system receives indicators of low-frequency (LF) signal strength between the key fob and the vehicle from the backscatter Wi-Fi communication between the key fob and the vehicle to determine a location of the key fob relative to the vehicle for passive-entry passive-start. In some examples, the system utilizes backscatter of wideband Wi-Fi communication to collect pressure measurements of vehicle tires from pressure sensors to (i) enable the pressure measurements to be collected on-demand and (ii) to collect the pressure measurements in a more energy efficient manner.

As used herein, a "key fob" refers to an electronic mobile device (e.g., a dedicated electronic device or a multi-purpose electronic device such as a smart phone, etc.) that wirelessly communicates with a vehicle to unlock and/or lock vehicle door(s), open and/or close the vehicle door(s), activate an engine of the vehicle, and/or control other function(s) of the vehicle.

As used herein, "passive entry" and "passive-entry" refer to a system of a vehicle that unlock(s) and/or open(s) one or more doors of the vehicle upon detecting that a key fob is proximate to a door of the vehicle. Some passive entry systems trigger a door for opening in response to detecting that a key fob is approaching and/or within a predetermined range of the vehicle. In some such examples, the door is unlocked in response to detecting that (1) a user has touched a handle of the door and (2) the key fob is proximate to the door when the handle is touched. In other such examples, the door is unlocked in response to detecting that the key fob is within a predetermined zone near the vehicle that is within the predetermined range. As used herein, "passive start" and "passive-start" refer to a system of a vehicle that activates ignition of an engine of the vehicle upon detecting that a key fob is within a cabin of the vehicle (e.g., such that drive-away is enabled). Some passive start systems trigger an engine for ignition in response to detecting that a key fob is approaching and/or within a predetermined range of the vehicle. In such examples, the engine is started in response to detecting that (1) a user has engaged an ignition switch of the vehicle and (2) the key fob is within the cabin when the ignition switch is engaged. As used herein, "passive entry passive start," "passive-entry passive-start" and a "PEPS" refer to a system of vehicle that is configured to perform passive entry and passive start for the vehicle.

As used herein, a "backscatter signal" refers to a radio-frequency (RF) signal that is reflected by an electronic device towards another electronic device. In some instances, the electronic device that receives the backscatter signal is the electronic device that transmitted the initial RF signal. In some instances, an electronic device receives a signal, modulates the signal to add and/or modify information included within the signal, and returns the modulated signal as a backscatter signal to a transmitting electronic device. As used herein a "Wi-Fi backscatter signal" refers to a backscatter signal that is sent in accordance with the Wi-Fi communication protocol (e.g., IEEE 802.11 a/b/g/n/ac).

Figure 1B:
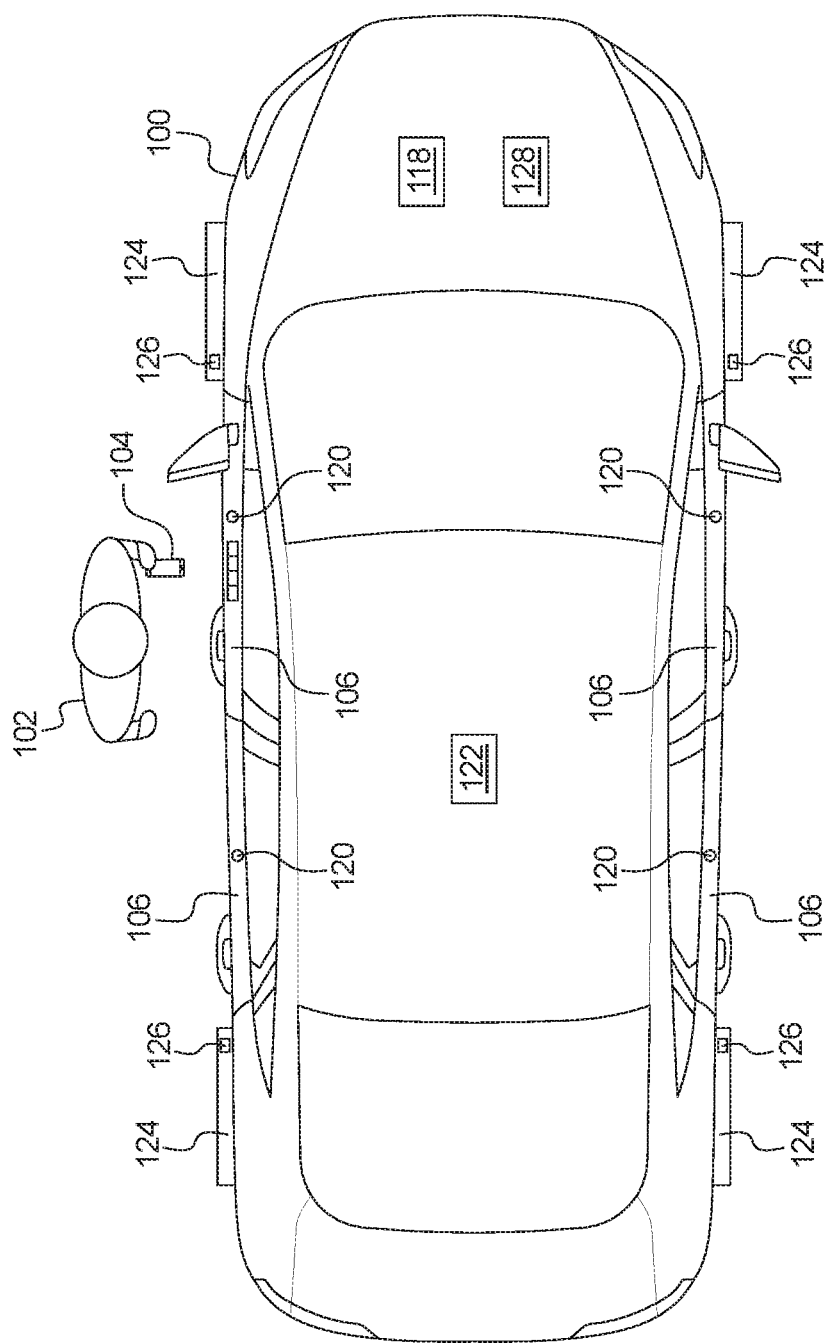
FIG. 1B further illustrates the vehicle of FIG. 1A.

Turning to the figures, FIGS. 1A and 1B illustrate an example vehicle 100 and a user 102 carrying an example key fob 104 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes one or more doors 106 and a cabin 108. The doors 106 enable the user 102 to enter and/or exit from the cabin 108 of the vehicle 100. For example, the user 102 grasps and/or otherwise engages one of the door handles 110 to open and/or close a corresponding one of the doors 106. The vehicle 100 also includes door handles 110 and handle sensors 112 (also referred to as door handle sensors). In some examples, each of the handle sensors 112 includes an unlock sensor (e.g., located on a B-side of a handle strap) and a lock sensor (e.g., located on an A-side edge of the corresponding one of the door handles 110 or on a B-pillar of the corresponding one of the doors 106). A corresponding one of the handle sensors 112 detects when the corresponding one of the door handles 110 is engaged. For example, each of the handle sensors 112 is a capacitive sensor and/or any other sensor that is configured to detect when a corresponding one of the door handles 110 is engaged. In some examples, each of the doors 106 includes one of the door handles 110 and one of the handle sensors 112. In other examples, one or more of the doors 106 does not include a handle sensor.

Further, one of the doors 106 of the illustrated example (e.g., the front driver-side door) includes a keypad 114 that is configured to receive a code from the user 102 (e.g., to unlock one of the doors 106, to lock all of the doors 106, to start an engine, etc.). The keypad 114 includes buttons that are labeled with characters (e.g., numeric characters, alphabetic characters, alphanumeric characters) to enable the user 102 to identify the buttons. For example, to enable the user 102 to enter a numeric code, one button may be labeled "1-2," another button may be labeled "3-4," another button may be labeled "5-6," another button may be labeled "7-8," and another button may be labeled "9-0." In other examples, the keypad 114 is located on any other of the doors 106 and/or other exterior surface of the vehicle 100. Alternatively, the keypad 114 is a virtual keypad projected onto a surface (e.g., a window) of the vehicle 100. Further, in some examples, the vehicle 100 includes a plurality of keypads that are located at and/or projected onto different positions on the exterior surface of the vehicle 100.

As illustrated in FIG. 1A, the vehicle 100 also includes a communication module 116 that includes hardware (e.g., processors, memory, storage, antenna, etc.) and software to control wireless network interface(s). For example, the communication module 116 includes communication controller(s) for Wi-Fi® communication, low-frequency (LF) communication, and/or other personal or local area wireless network protocols (e.g., Bluetooth®, Bluetooth® Low Energy (BLE), Zigbee®, Z-Wave®, etc.). For example, the communication module 116 includes a Wi-Fi antenna for Wi-Fi communication. Additionally or alternatively, the communication module 116 includes an LF antenna for LF communication and/or a BLE antenna for BLE communication. Further, in some examples, the communication module 116 includes one or more communication controllers for cellular network(s) (e.g., Global System for Mobile Communications (GSM), Universal Mobile Telecommunications System (UMTS), Long Term Evolution (LTE), Code Division Multiple Access (CDMA)), Near Field Communication (NFC), and/or other standard-based network(s). In the illustrated example, the communication module 116 is configured to communicatively couple to the key fob 104 of the user 102. Further, the communication module 116 is configured to determine a time-of-flight of communication with the key fob 104. For example, the communication module 116 determines the time it takes for the key fob 104 to respond to a communication request. In some examples, time-of-flight is determined using the Fine Timing Measurement protocol of 802.11mc (sometimes referred to as Wi-Fi Round Trip Time (RTT), and sometimes branded Wi-Fi Location) or some other time of flight protocol. Further, the communication module 122 is configured to determine a distance to the key fob 104 based on the corresponding time-of-flight.

The vehicle 100 of the illustrated example also includes a PEPS controller 118 that controls operation of PEPS functions for the vehicle 100, such as passive entry and/or passive start. For example, in operation, the PEPS controller 118 determines whether a PEPS request (also referred to as an access request) was received. For example, the PEPS controller 118 identifies a passive entry request responsive to one of the handle sensors 112 detecting that a corresponding one of the door handles 110 is engaged (e.g., grasped) and/or identifies a passive start request responsive to the ignition switch sensor 222 detecting that an ignition switch of the vehicle 100 is engaged (e.g., pressed, rotated). Upon receiving a PEPS request, the PEPS controller 118 attempts to verify that the key fob 104 associated with the user 102 and the vehicle 100 is positioned near a location that corresponds with the PEPS request. That is, the PEPS controller 118 attempts to verify that the key fob 104 is near one of the doors 106 upon receiving a passive entry request and/or the PEPS controller 118 attempts to verify that the key fob 104 is near an ignition switch within the cabin 108 upon receiving a passive start request.

To detect whether a relay attack is occurring, the PEPS controller 118 compares a distance corresponding with a PEPS request (e.g., next to one of the doors 106 for a passive entry request) to a distance to the key fob 104. If the distance to the key fob 104 matches and/or is substantially similar to the distance corresponding with the PEPS request, the PEPS controller 118 determines that the PEPS request is valid and performs the PEPS request. For example, the PEPS controller 118 permits one or more of the doors 106 to be unlocked in response to determining that a passive entry request is legitimate. In contrast, if the distance to the key fob 104 is not substantially similar to the distance corresponding with the PEPS request, the PEPS controller 118 detects a relay attack and prevents performance of the PEPS request. For example, the PEPS controller 118 prevents the doors 106 from being unlocked in response to detecting a relay attack for a passive entry request.

The vehicle 100 of FIG. 1A determines a distance to the key fob 104 based upon a time-of-flight (measured e.g., as the round trip time) of a Wi-Fi signal that is sent by the communication module 116 and reflected by the key fob 104. For example, the PEPS controller 118 identifies the time-of-flight of a Wi-Fi signal that is sent by the communication module 116, reflected by the key fob 104 as a backscatter signal, and subsequently received by the communication module 116. The PEPS controller 118 of the illustrated example determines the distance between the key fob 104 and the communication module 116 based on the measured time-of-flight. Further, the PEPS controller 118 determines the distance between the key fob 104 and a position corresponding to a PEPS request (e.g., next to one of the doors 106 for a passive entry request) based upon (1) a known distance between the communication module 116 and a position corresponding to the PEPS request and (2) the calculated distance between the key fob 104 and the communication module 116.

In some examples, the PEPS controller 118 determines whether a relay attack is occurring by comparing the time-of-flight of the Wi-Fi signal to a known turnaround time corresponding to the position at which the PEPS request is to be transmitted when the key fob 104 is within a predetermined distance from the vehicle 100. For example, the turnaround time for a passive entry request corresponds with a time it takes for a signal to be sent from the communication module 116, received by a key fob located next to one of the doors 106, and subsequently returned to the communication module 116. In such examples, if the time-of-flight does not match and/or is not substantially similar to the turnaround time, the PEPS controller 118 determines that a relay attack is occurring.

The PEPS system of the illustrated example utilizes a Wi-Fi backscatter signal to reduce the amount of energy consumed in processing the signal. For example, utilization of Wi-Fi backscatter signals enables the key fob 104 to be a passive and/or semi-passive electronic device without a power source. Further, the PEPS controller 118 determines the time-of-flight of the Wi-Fi backscatter signal, because time-of-flight is immune to relay attacks that otherwise trick a vehicle by increasing a signal strength of a signal. That is, a time-of-flight of a signal is unaffected by a signal strength of a signal. Rather, a time-of-flight of a signal is affected by a distance travelled by the signal.

As illustrated in FIG. 1B, the vehicle 100 includes antenna modules 120 and another communication module 122. The antenna modules 120 (also referred to as communication modules) of the illustrated example include hardware (e.g., processors, memory, storage, antenna, etc.) and software to control wireless network interface(s). For example, the antenna modules 120 include communication controllers for Wi-Fi® communication, low-frequency (LF) communication, and/or other personal or local area wireless network protocols (e.g., Bluetooth®, Bluetooth® Low Energy (BLE), Zigbee®, Z-Wave®, etc.). For example, each of the antenna modules 120 includes a Wi-Fi antenna for Wi-Fi communication and/or an LF antenna for LF communication. In some examples, the antenna modules 120 may be referred to as "BLE Antenna Modules (BLEAMs)" when the antenna modules 120 are configured to implement BLE communication." Further, the antenna modules 120 of the illustrated example communicatively couple to the key fob 104 and measure and/or receive measurements of the signal strength of the signals (e.g., received signal strength indicators) broadcast by the key fob 104 to facilitate determining a distance to and/or a location of the key fob 104 relative to the vehicle 100. Further, in some examples, the vehicle 100 includes one or more internal antenna modules (not shown) located inside the cabin 108 of the vehicle 100 to facilitate determining when the key fob 104 is within the cabin 108 of the vehicle 100 (e.g., to enable passive start of the engine of the vehicle 100).

The communication module 122 is communicatively coupled to the antenna modules 120 to track a distance to and/or a location of the key fob 104 relative to the vehicle 100. In some examples, the communication module 116 may be referred to as "BLE Module (BLEM)" when the antenna modules 120 are configured to implement BLE communication. In the illustrated example, the communication module 122 receives and analyzes the signal strength measurements (e.g., received signal strength indicators) between the antenna modules 120 and the key fob 104. Based on these measurements, the communication module 122 determines a location of the key fob 104 relative to portions of the vehicle 100. For example, the communication module 122 is configured to determine a location of the key fob 104 with respect to one or more of the doors 106 of the vehicle 100.

For example, in operation, the PEPS controller 118 determines whether a PEPS request was received by detecting a location of an electronic device relative to the vehicle 100. For example, the PEPS controller 118 identifies a passive entry request responsive to one of the handle sensors 112 detecting that a corresponding one of the door handles 110 is engaged (e.g., grasped) and/or identifies a passive start request responsive to the ignition switch sensor 222 detecting that an ignition switch of the vehicle 100 is engaged (e.g., pressed, rotated). Upon receiving a PEPS request, the PEPS controller 118 attempts to verify that the key fob 104 associated with the user 102 and the vehicle 100 is positioned near a location that corresponds with the PEPS request. To detect whether a relay attack is occurring, the PEPS controller 118 of the illustrated example compares a location corresponding with a PEPS request (e.g., next to one of the doors 106 for a passive entry request) to a location of the key fob 104. If the location of the key fob 104 matches and/or is substantially similar to the location corresponding with the PEPS request, the PEPS controller 118 determines that the PEPS request is valid and performs the PEPS request. In contrast, if the location of the key fob 104 is not substantially similar to the distance corresponding with the PEPS request, the PEPS controller 118 detects a relay attack and prevents performance of the PEPS request.

The vehicle 100 of FIG. 1B determines a location of the key fob 104 based upon signal strength indicators (e.g., a received signal strength indicator) of LF signals sent from the antenna modules 120 and received by the key fob 104. For example, the key fob 104 determines the signal strength indicators of the LF signals and modulates the signal strength indicators into Wi-Fi backscatter signals sent between the antenna modules 120 and the key fob 104 to enable the communication module 122 to receive the signal strength indicators via the Wi-Fi backscatter signals and the antenna modules 120. For example, to enable the passive and/or semi-passive key fob 104 to receive LF signals and determine the signal strength indicators of the LF signals, the antenna modules 120 send the LF signals at the same time and/or immediately after sending the Wi-Fi backscatter signals. The electronic components are energized via the received Wi-Fi backscatter signal to receive the LF signals, determine the signal strength indicators, modulate the Wi-Fi backscatter signals to include the signal strength indicators, and reflect the Wi-Fi backscatter signals back to the antenna modules 120 of the vehicle 100. Subsequently, the PEPS controller 118 and/or the communication module 122 of the illustrated example determines the location of the key fob 104 based upon the signal strength indicators (e.g., utilizing trilateration).

In other examples, the distance determination through Wi-Fi backscatter signals may be accurate and robust enough without the utilization of LF signals. In such examples, the PEPS controller 118 may determine the location of the key fob 104 based upon times-of-flight of Wi-Fi communication between the key fob 104 and the antenna modules 120. In some such examples, the 60-GHz Wi-Fi band is utilized due to its wide bandwidth and, thus, accurate time-of-flight capabilities. For example, the antenna modules 120 transmit Wi-Fi signals upon the PEPS controller 118 detecting a PEPS request. The key fob 104 receives the Wi-Fi signals from the antenna modules 120 and sends backscatter signals, which are reflections of the Wi-Fi signals, to the antenna modules 120. Further, the PEPS controller 118 identifies the time-of-flight for each pair of the Wi-Fi signals and backscatter signals that are transmitted between the antenna modules 120 and the key fob 104. Subsequently, the PEPS controller 118 of the illustrated example determines a location of the key fob 104 relative to the vehicle 100 based on the times-of-flight (e.g., utilizing trilateration).

As illustrated in FIG. 1B, the vehicle also includes tires 124 and corresponding tire pressure monitoring system (TPMS) sensors 126. The TPMS sensors 126 of the illustrated example include sensor(s) and circuitry configured to determine tire pressures and/or other characteristics of the tires 124. For example, each of the TPMS sensors 126 include a pressure sensor to collect a pressure measurement of the corresponding one of the tires 124. Each of the TPMS sensors 126 include and/or are communicatively coupled to processor(s) and/or memory. Further, each of the TPMS sensors 126 includes circuitry to facilitate wireless communication with the communication module 116 and/or the antenna modules 120 of the vehicle 100. For example, the TPMS sensors 126 include communication modules that communication with the communication module 116 and/or the antenna modules 120 via Wi-Fi backscatter signals, LF signal, and/or other wireless signals such as high-frequency signals, ultra-high frequency (e.g., 315 MHz and/or 433 MHz) signals, Ultra-Wide Band (UWB) signals, Bluetooth® communication protocol, Bluetooth® Low Energy (BLE) protocol, Wi-Fi communication protocol (e.g., IEEE 802.11 a/b/g/n/ac), etc.

The vehicle 100 of the illustrated example also includes a TPMS controller 128 that controls operation of a TPMS system of the vehicle 100. For example, in operation, the TPMS controller 128 determines whether it is time to collect pressure measurements of the tires 124. For example, the TPMS controller 128 determines that it is time to collect pressure measurements of the tires 124 when the TPMS system is in an active mode, an anticipated mode, and/or an on-demand mode. Upon determining that it is time to collect tire pressure measurements, the TPMS controller 128 sends Wi-Fi signals to the TPMS sensors 126 via the communication module 116 and/or the antenna modules 120. For example, the electronic components of the TPMS sensors 126 are energized by the received Wi-Fi signals. Upon being energized, the TPMS sensors 126 collect the pressure measurements of the tires 124, modulate the Wi-Fi signals to include the collected tire pressure measurements, and reflect the modulated Wi-Fi signals as backscatter signals back to the communication module 116 and/or the antenna modules 120 of the vehicle 100.

In some examples, upon receiving the tire pressure measurements, the TPMS controller 128 presents the tire pressure measurements and/or pressure alerts of the tires 124 via a display. Further, in some examples, the TPMS controller 128 compares the collected tire pressure measurements to a low-pressure threshold and/or a high-pressure threshold. The TPMS controller 128 emits a low-pressure alert when at least one of the tire pressure measurements is less than the low-pressure threshold and/or a high-pressure alert when at least one of the tire pressure measurements is greater than the high-pressure threshold.

The TPMS sensors 126 of the illustrated example also are configured to monitor for rapid pressure changes (e.g., punctures or inflation) of one or more of the tires 124. For example, in response to one or more of the TPMS sensors 126 detecting a rapid pressure change, a corresponding one of the TPMS sensors 126 enters an active mode. In some examples, if the TPMS sensors 126 include a dedicated radio transceiver, the TPMS sensors 126 are configured to send a signal to the communication module 116 and/or the antenna modules 120 of the vehicle 100 to instruct the TPMS controller 128 to collect tire pressure measurements via the Wi-Fi backscatter communication sequence. In other examples, the TPMS sensors 126 are configured to wait for period backscatter communication polling of the vehicle 100 to transmit the tire pressure data.

Figure 2:
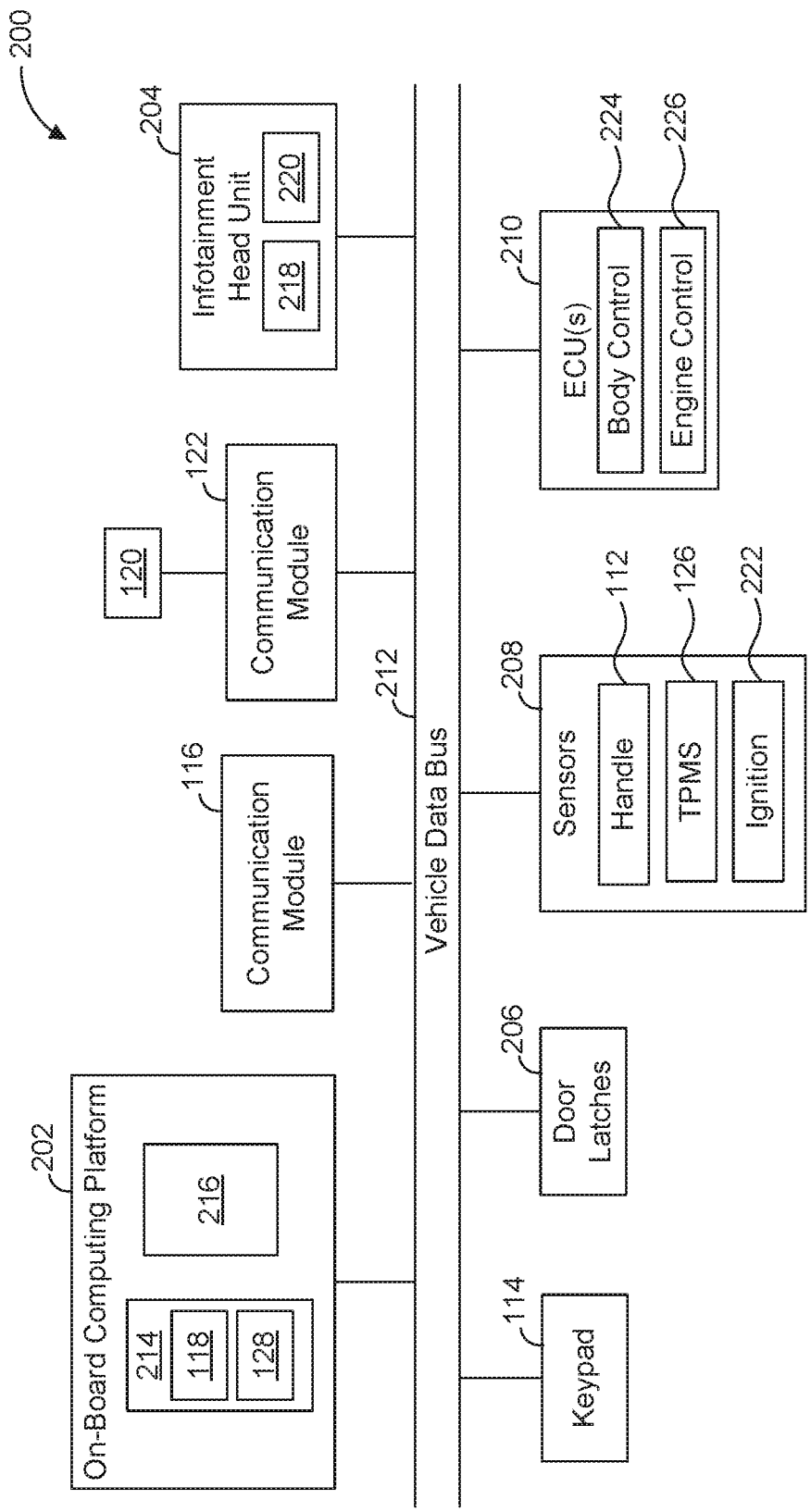
FIG. 2 is a block diagram of electronic components of the vehicle of FIG. 1.

FIG. 2 is a block diagram of electronic components 200 of the vehicle 100. As illustrated in FIG. 2, the electronic components 200 includes an on-board computing platform 202, the communication module 116, the communication module 122 in communication with the antenna modules 120, an infotainment head unit 204, the keypad 114, door latches 206, sensors 208, electronic control units (ECUs) 210, and a vehicle data bus 212.

The on-board computing platform 202 includes a microcontroller unit, controller or processor 214 and memory 216. In some examples, the processor 214 of the on-board computing platform 202 is structured to include the PEPS controller 118 and/or the TPMS controller 128. Alternatively, in some examples, the PEPS controller 118 and/or the TPMS controller 128 are incorporated into another ECU with its own processor and memory. In other examples, the PEPS controller 118 is incorporated into the communication module 116 and/or the communication module 122. The processor 214 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 216 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 216 includes multiple kinds of memory, particularly volatile memory and non-volatile memory.

The memory 216 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 216, the computer readable medium, and/or within the processor 214 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 204 provides an interface between the vehicle 100 and the user 102. The infotainment head unit 204 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a display 218 (e.g., a heads-up display, a center console display such as a liquid crystal display (LCD), an organic light emitting diode (OLED) display, a flat panel display, a solid state display, etc.), and/or speakers 220. For example, the display 218, the speakers 220, and/or other output device(s) of the infotainment head unit 204 present information, such as tire pressure measurements, to the user 102. Further, the infotainment head unit 204 of the illustrated example includes hardware (e.g., a processor or controller, memory, storage, etc.) and software (e.g., an operating system, etc.) for an infotainment system (such as SYNC® and MyFord Touch® by Ford®. Additionally, the infotainment head unit 204 displays the infotainment system on, for example, the display 218.

The door latches 206 of the illustrated example are electronic devices that lock and unlock the doors 106 of the vehicle 100. In some examples, the door latches 206 (also referred to as electronic latches or e-latches) are communicatively coupled to handle sensors 112 to identify when the user 102 and/or another person is attempting to open one or more of the doors 106. For example, the PEPS controller 118 sends a signal that causes one or more of the door latches 206 to unlock and/or unlatch the corresponding one or more of the doors 106 in response to (1) one of the handle sensors 112 detecting that the user 102 is attempting to open one of the doors 106 and (2) the PEPS controller 118 determining that the key fob 104 of the user 102 associated with the vehicle 100 is near that one of the doors 106.

The sensors 208 are arranged in and/or around the vehicle 100 to monitor properties of the vehicle 100 and/or an environment in which the vehicle 100 is located. One or more of the sensors 208 may be mounted to measure properties around an exterior of the vehicle 100. Additionally or alternatively, one or more of the sensors 208 may be mounted inside a cabin of the vehicle 100 or in a body of the vehicle 100 (e.g., an engine compartment, wheel wells, etc.) to measure properties in an interior of the vehicle 100. For example, the sensors 208 include accelerometers, odometers, tachometers, pitch and yaw sensors, wheel speed sensors, microphones, tire pressure sensors, biometric sensors and/or sensors of any other suitable type.

In the illustrated example, the sensors 208 include the handle sensors 112, the TPMS sensors 126, and an ignition switch sensor 222. For example, the handle sensors 112 (e.g., capacitive touch sensors, infrared sensors, a pushbutton switch, an angular rotation sensor, etc.) detect when the door handles 110 of the doors 106 are engaged (e.g., by the user 102), and the TPMS sensors 126 pressure measurements of the tires 124. Further, the ignition switch sensor 222 detects a position of an ignition switch (e.g., an engine on-position, a start position, an off-position, an accessory position) for an engine of the vehicle 100.

The ECUs 210 monitor and control the subsystems of the vehicle 100. For example, the ECUs 210 are discrete sets of electronics that include their own circuit(s) (e.g., integrated circuits, microprocessors, memory, storage, etc.) and firmware, sensors, actuators, and/or mounting hardware. The ECUs 210 communicate and exchange information via a vehicle data bus (e.g., the vehicle data bus 212). Additionally, the ECUs 210 may communicate properties (e.g., status of the ECUs 210, sensor readings, control state, error and diagnostic codes, etc.) to and/or receive requests from each other. For example, the vehicle 100 may have dozens of the ECUs 210 that are positioned in various locations around the vehicle 100 and are communicatively coupled by the vehicle data bus 212.

In the illustrated example, the ECUs 210 include a body control module 224 and an engine control unit 226. The body control module 224 controls one or more subsystems throughout the vehicle 100, such as power windows, power locks, an immobilizer system, power mirrors, etc. For example, the body control module 224 includes circuits that drive one or more of relays (e.g., to control wiper fluid, etc.), brushed direct current (DC) motors (e.g., to control power seats, power locks, power windows, wipers, etc.), stepper motors, LEDs, etc. The engine control unit 226 control(s) operation (e.g., passive starting) of an engine of the vehicle 100.

The vehicle data bus 212 communicatively couples the keypad 114, the communication module 116, the communication module 122, the on-board computing platform 202, the infotainment head unit 204, the door latches 206, the sensors 208, and the ECUs 210. In some examples, the vehicle data bus 212 includes one or more data buses. The vehicle data bus 212 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
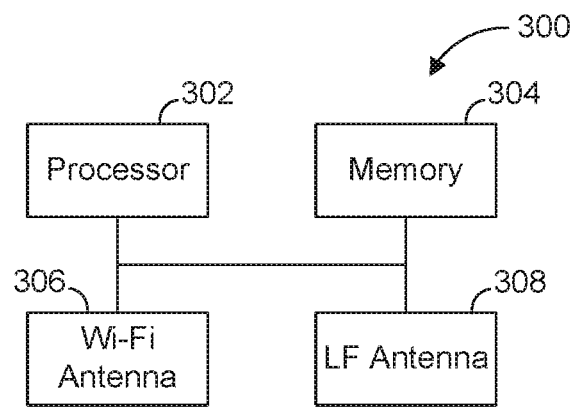
FIG. 3 is a block diagram of electronic components of a key fob.

FIG. 3 is a block diagram of electronic components 300 of the key fob 104. In the illustrated example, the electronic components 300 include a processor 302, memory 304, a Wi-Fi antenna 306, and a LF antenna 308.

The processor 302 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 304 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 304 includes multiple kinds of memory, particularly volatile memory and non-volatile memory.

The memory 304 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 304, the computer readable medium, and/or within the processor 302 during execution of the instructions.

The Wi-Fi antenna 306 of the illustrated example is an antenna configured for Wi-Fi backscatter communication. The key fob 104 may also include other hardware (e.g., a processor, memory, storage, etc.) and software to enable and control Wi-Fi communication of the Wi-Fi antenna 306. In the illustrated example, the Wi-Fi antenna 306 is configured to (1) receive Wi-Fi signal(s) from the communication module 116 and/or the antenna modules 120 of the vehicle 100 and (2) reflect the Wi-Fi signal(s) as backscatter signal(s) back to the communication module 116 and/or the antenna modules 120 of the vehicle 100. In some examples, the electronic components 300 of the key fob 104 are temporarily powered by Wi-Fi backscatter signals received by the Wi-Fi antenna 306 (e.g., to process and return Wi-Fi backscatter signals). In some such examples, the key fob 104 does not include a battery and is solely powered by the Wi-Fi backscatter signal(s) received by the Wi-Fi antenna 306.

The LF antenna 308 (e.g., a 3-axis LF antenna) of the illustrated example is an antenna configured for LF communication. The key fob 104 may also include other hardware (e.g., a processor, memory, storage, etc.) and software to enable and control LF communication of the LF antenna 308. In the illustrated example, the LF antenna 308 is configured to receive LF signal(s) from the communication module 116 and/or the antenna modules 120 of the vehicle 100.

Additionally or alternatively, the key fob 104 may include any other wireless interface(s) that enable the key fob 104 to communicate with other devices and/or external networks. The key fob 104 may include hardware (e.g., processors, memory, storage, antenna, etc.) and software to control the wired or wireless network interfaces. For example, the key fob 104 may implement Bluetooth® communication, BLE communication, Near Field Communication (NFC), ultra-wide band (UWB) communication, super-high frequency (SHF) communication, ultra-high frequency (UHF) communication, and/or any other communication protocol that enables the key fob 104 to wirelessly communicate with the vehicle 100.

Figure 4:
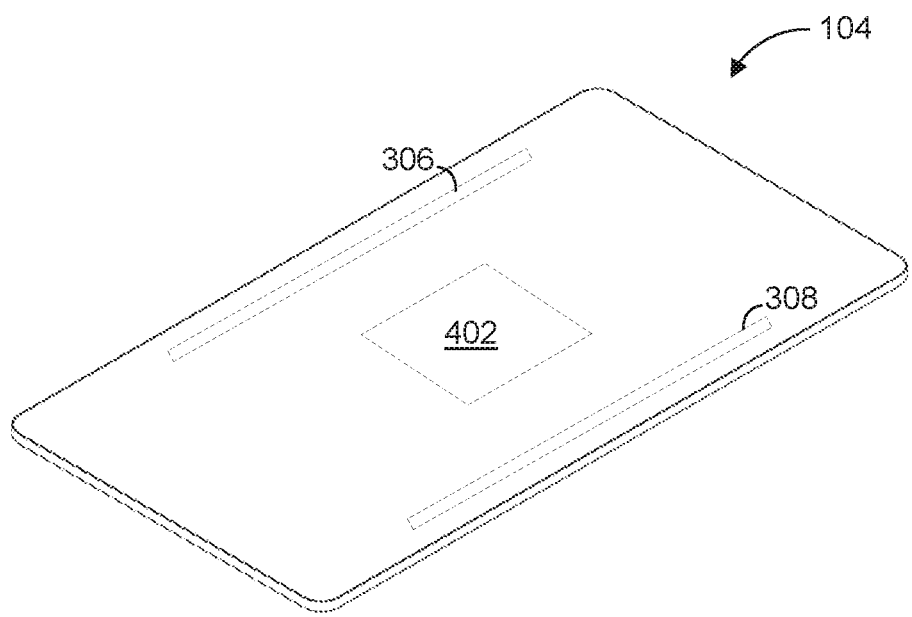
FIG. 4 illustrates an example key fob in accordance with the teachings herein.

FIG. 4 illustrates an example form of the key fob 104 in accordance with the teachings herein. As illustrated in FIG. 4, the key fob 104 is credit card-shaped and is configured to be stored conveniently within a wallet of the user 102. In the illustrated example, the key fob 104 includes the Wi-Fi antenna 306, the LF antenna 308, and circuitry 402 (e.g., including the processor 302 and/or the memory 304 of FIG. 3). For example, the circuitry 402 is configured to (1) determine a signal strength (e.g., a received signal strength identifier) of an LF signal received by the LF antenna 308, (2) modulate the Wi-Fi signal received by the Wi-Fi antenna 306, and (3) cause the Wi-Fi antenna 306 to reflect the modulated Wi-Fi signal as a backscatter signal back to the vehicle 100. In the illustrated example, the electronic components of the key fob 104 is a passive electronic device without a battery. The electronic components of the illustrated example are powered solely by the Wi-Fi signal(s) received by the Wi-Fi antenna 306 and/or any other RF signal. That is, the electronic components of the key fob 104 (e.g., the Wi-Fi antenna 306, the LF antenna 308, the circuitry 402) are energized by the received Wi-Fi backscatter signal to (1) receive the LF signal, (2) determine the signal strength of the received LF signal, (3) modulate the Wi-Fi signal, and (4) reflect the modulated Wi-Fi signal as a backscatter signal. Further, the key fob 104 of FIG. 4 is able to have the relatively small thickness of a credit card as a result of not including a battery.

Additionally or alternatively, the key fob 104 may include a BLE antenna and/or low-power Wi-Fi antenna for long-range communication (e.g., for distances of 100 meters and beyond). For example, the BLE and/or low-power Wi-Fi antenna along with a low-capacity thin-film battery. In such examples, the BLE and/or low-power Wi-Fi antenna is shut down most of the time and is activated only for remote keyless entry (RKE) events. Additionally or alternatively, the BLE and/or low-power Wi-Fi antenna may be powered by energy harvested from the Wi-Fi backscatter signals. In other examples, the key fob 104 utilizes other ambient RF signals (e.g., TV, cellular, etc.) to power and backscatter a signal back to the vehicle 100.

Figure 5:
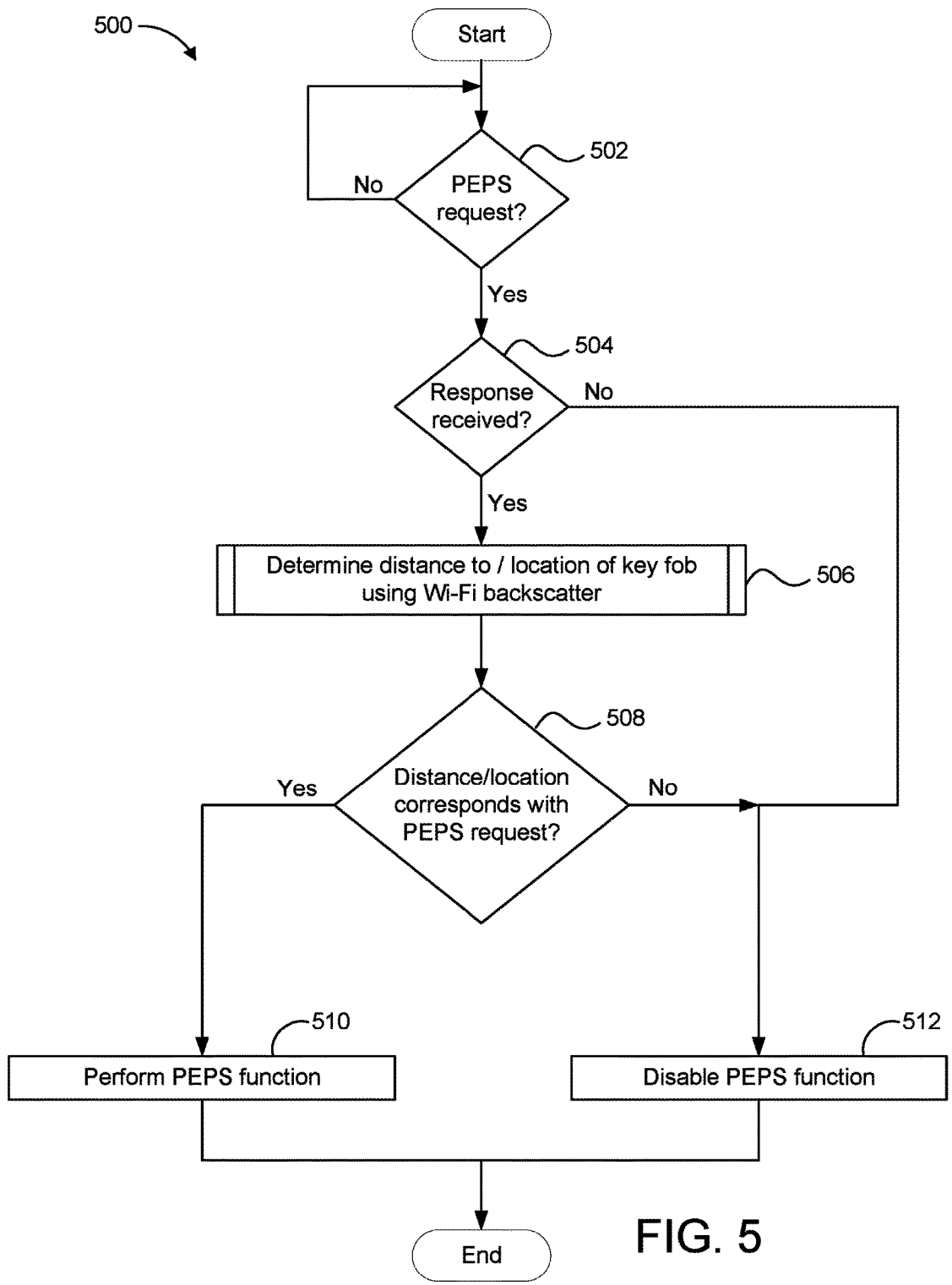
FIG. 5 is a flowchart for utilizing backscatter communication for a passive-entry passive-start system of a vehicle in accordance with the teachings herein.

FIG. 5 is a flowchart of an example method 500 to utilize backscatter communication for a passive-entry passive-start system of a vehicle. The flowchart of FIG. 5 is representative of machine readable instructions that are stored in memory (such as the memory 216 of FIG. 2) and include one or more programs which, when executed by a processor (such as the processor 214 of FIG. 2), cause the vehicle 100 to implement the example PEPS controller 118 of FIGS. 1A-2. While the example program is described with reference to the flowchart illustrated in FIG. 5, many other methods of implementing the example PEPS controller 118 may alternatively be used. For example, the order of execution of the blocks may be rearranged, changed, eliminated, and/or combined to perform the method 500. Further, because the method 500 is disclosed in connection with the components of FIGS. 1A-4, some functions of those components will not be described in detail below.

Initially, at block 502, the PEPS controller 118 determines whether a PEPS request (e.g., a passive entry request, a passive start request) was received. For example, the PEPS controller 118 identifies a passive entry request responsive to one of the handle sensors 112 detecting that a corresponding one of the door handles 110 is engaged (e.g., grasped) and/or identifies a passive start request responsive to the ignition switch sensor 222 detecting that an ignition switch of the vehicle 100 is engaged (e.g., pressed, rotated). In response to the PEPS controller determining that a PEPS request has not been received, the method 500 remains at block 502. Otherwise, in response to the PEPS controller determining that a PEPS request has been received, the method 500 proceeds to block 504.

At block 504, the PEPS controller 118 detects whether a response signal has been received from a nearby key fob associated with the vehicle 100. For example, upon identifying a PEPS request, the PEPS controller 118 transmits a signal via an antenna. The PEPS controller 118 receives the response signal if a nearby key fob sends the return signal in response to receiving the transmission from the vehicle antenna. In response to the PEPS controller 118 not receiving a response signal from a key fob, the method 500 proceeds to block 512. Otherwise, in response to the PEPS controller 118 receiving a response signal from a key fob, the method 500 proceeds to block 506.

At block 506, the PEPS controller 118 determines a distance to and/or a relative location of the key fob 104 using Wi-Fi backscatter communication. As disclosed in further detail below with respect to FIG. 6, the PEPS controller 118 determines a distance between the key fob 104 and the vehicle 100 using time-of-flight of Wi-Fi backscatter communication. As disclosed in further detail below with respect to FIG. 7, the PEPS controller 118 determines a distance between the key fob 104 and the vehicle 100 using Wi-Fi backscatter communication that includes signal strengths of LF communication. At block 506, the PEPS controller 118 determines whether the distance to and/or location of the key fob 104 corresponds with a PEPS request.

In some examples, the PEPS controller 118 determines that the key fob 104 corresponds with a passive entry request triggered by engagement of one of the door handles 110 upon determining that the distance to the key fob 104 corresponds with a distance to that one of the door handles 110. That is, the PEPS controller 118 determines whether the key fob 104 is not near the one of the door handles 110 corresponding with the passive entry request. For example, the PEPS controller 118 determines whether the distance to the key fob 104 corresponds with the passive entry request by comparing the time-of-flight of Wi-Fi backscatter communication to an expected turnaround time for wireless communication of an electronic object that is near the one of the door handles 110 corresponding with the passive entry request. If the time-of-flight matches and/or is substantially similar to the expected turnaround time, the PEPS controller 118 determines that the distance to the key fob 104 corresponds with the passive entry request. In contrast, if the time-of-flight is not substantially similar to the expected turnaround time, the PEPS controller 118 determines that the distance to the key fob 104 does not correspond with the passive entry request. Additionally or alternatively, the PEPS controller 118 determines that the key fob 104 corresponds with a passive start request in response to determining that the distance to the key fob 104 corresponds with a distance to an ignition switch of the vehicle 100 upon actuation of the ignition switch.

In some examples, the PEPS controller 118 determines that the key fob 104 corresponds with a passive entry request triggered by engagement of one of the door handles 110 upon determining that the location of the key fob 104 corresponds with a location of that one of the door handles 110. That is, the PEPS controller 118 determines whether the key fob 104 is near the one of the door handles 110 corresponding with the passive entry request. For example, the PEPS controller 118 determines the location of the key fob 104 based on a signal strength of LF communication between the key fob 104 and the vehicle 100. If the location of the key fob 104 matches and/or is substantially similar to the location of the one of the door handles 110 corresponding to the passive entry request, the PEPS controller 118 determines that the location of the key fob 104 corresponds with the passive entry request. In contrast, if the location of the key fob 104 is not substantially similar to the location of the one of the door handles 110 corresponding to the passive entry request, the PEPS controller 118 determines that the location of the key fob 104 does not correspond with the passive entry request. Additionally or alternatively, the PEPS controller 118 determines that the key fob 104 corresponds with a passive start request in response to determining that the location of the key fob 104 corresponds with a location of the ignition switch of the vehicle 100.

In response to the PEPS controller 118 determining that the distance to and/or location of the key fob 104 corresponds with a PEPS request, the method 500 proceeds to block 510. Otherwise, in response to the PEPS controller 118 determining that the distance to and/or location of the key fob 104 does not correspond with a PEPS request, the method 500 proceeds to block 512.

At block 510, the PEPS controller 118 performs and/or permits performance of the PEPS request. For example, if the PEPS request is a passive entry request, the PEPS controller 118 enables access to the cabin 108 of the vehicle 100 by permitting one or more of the doors 106 (e.g., at least the one of the doors 106 corresponding with the passive entry request) to be unlocked. Further, the PEPS controller 118 provides the user 102 with access to the engine of the vehicle 100 by activating the engine if the PEPS request is a passive start request.

At block 512, the PEPS controller 118 prevents performance of the PEPS request. For example, if the PEPS request is a passive entry request, the PEPS controller 118 prevents the doors 106 from being unlocked via passive entry. If the PEPS request is a passive start request, the PEPS controller 118 prevents activation of the engine via passive starting.

Figure 6:
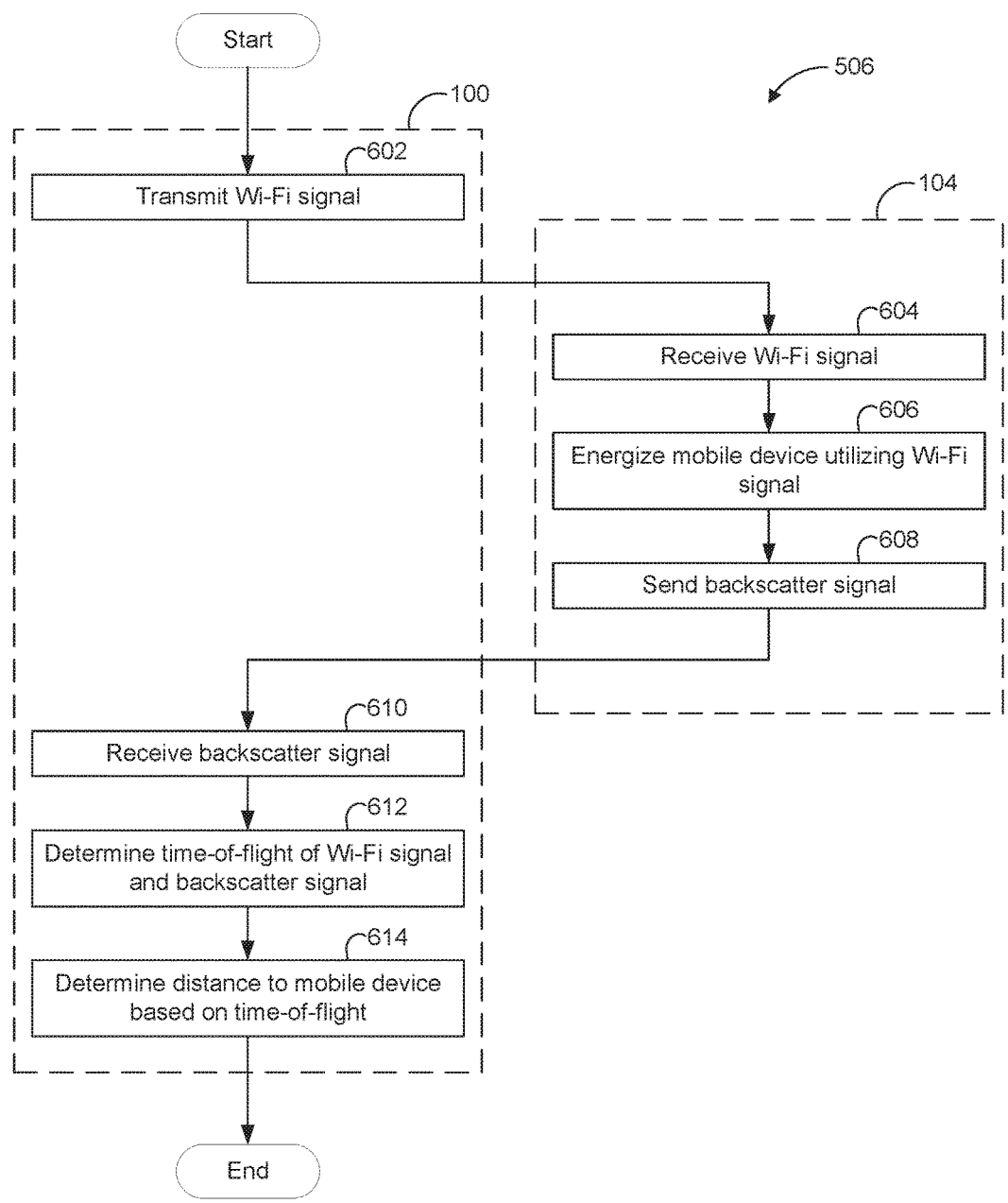
FIG. 6 is a flowchart for utilizing backscatter communication to identify a distance to a key fob for the flowchart of FIG. 5.

FIG. 6 is a flowchart of an example method 506 to perform block 506 of FIG. 5 to determine a distance between a key fob and a vehicle utilizing backscatter communication. The flowchart of FIG. 6 is representative of machine readable instructions that are stored in memory (such as the memory 216 of FIG. 2) and include one or more programs which, when executed by a processor (such as the processor 214 of FIG. 2), cause the vehicle 100 to implement the example PEPS controller 118 of FIGS. 1A-2. While the example program is described with reference to the flowchart illustrated in FIG. 6, many other methods of implementing the example PEPS controller 118 may alternatively be used. For example, the order of execution of the blocks may be rearranged, changed, eliminated, and/or combined to perform the example method 506. Further, because the example method 506 is disclosed in connection with the components of FIGS. 1A-4, some functions of those components will not be described in detail below.

Initially, at block 602, the PEPS controller 118 sends a Wi-Fi signal via the communication module 116. At block 604, the Wi-Fi antenna 306 of the key fob 104 receives the Wi-Fi signal. At block 606, the Wi-Fi signal sent by the communication module 116 and received by the Wi-Fi antenna 306 energizes the electronic components 300 of the key fob 104 (e.g., the circuitry 402, the processor 302, the memory 304, the Wi-Fi antenna 306). At block 608, the Wi-Fi antenna 306 sends a reflection of the Wi-Fi signal as a backscatter signal to the communication module 116 of the vehicle 100. At block 610, the PEPS controller 118 of the vehicle 100 receives the Wi-Fi backscatter signal via the communication module 116. At block 612, the PEPS controller 118 determines the time-of-flight of the Wi-Fi signal and the corresponding backscatter signal. At block 614, the PEPS controller 118 determines the distance between the key fob 104 and the communication module 116 based on the time-of-flight of the Wi-Fi backscatter communication. Based on a known distance between the communication module 116 and one or more of the doors 106, the PEPS controller 118 determines the distance between the key fob 104 and the one or more of the doors 106.

Additionally or alternatively, at block 602, the PEPS controller 118 sends Wi-Fi signal via the antenna modules 120. At block 604, the Wi-Fi antenna 306 of the key fob 104 receives the Wi-Fi signals. At block 606, one or more of the Wi-Fi signals sent by the communication module 116 and received by the Wi-Fi antenna 306 energize the electronic components 300 of the key fob 104. At block 608, the Wi-Fi antenna 306 sends reflections of the Wi-Fi signals as backscatter signals to the antenna modules 120 of the vehicle 100. At block 610, the PEPS controller 118 of the vehicle 100 receives the Wi-Fi backscatter signals via the antenna modules 120. At block 612, the PEPS controller 118 determines the times-of-flight of the Wi-Fi backscatter communication. At block 614, the PEPS controller 118 determines the location of the key fob 104 relative to the vehicle 100 based on the times-of-flight (e.g., utilizing trilateration).

Figure 7:
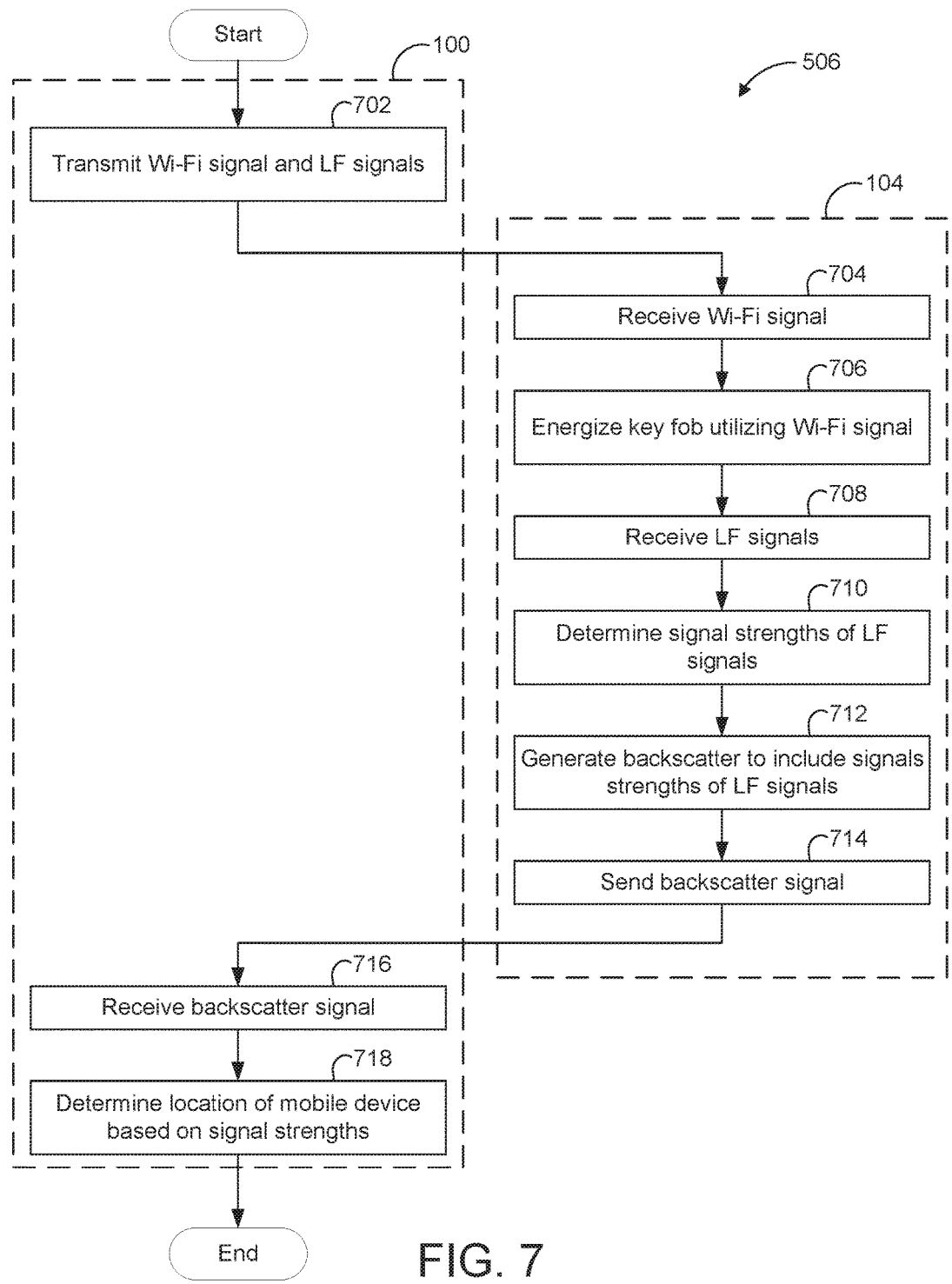
FIG. 7 is a flowchart for utilizing backscatter communication to identify a location of a key fob for the flowchart of FIG. 5.

FIG. 7 is a flowchart of another example method 506 to perform block 506 of FIG. 5 to determine a location of a key fob relative to a vehicle utilizing backscatter communication. The flowchart of FIG. 7 is representative of machine readable instructions that are stored in memory (such as the memory 216 of FIG. 2) and include one or more programs which, when executed by a processor (such as the processor 214 of FIG. 2), cause the vehicle 100 to implement the example PEPS controller 118 of FIGS. 1A-2. While the example program is described with reference to the flowchart illustrated in FIG. 7, many other methods of implementing the example PEPS controller 118 may alternatively be used. For example, the order of execution of the blocks may be rearranged, changed, eliminated, and/or combined to perform the example method 506. Further, because the example method 506 is disclosed in connection with the components of FIGS. 1A-4, some functions of those components will not be described in detail below.

Initially, at block 702, the PEPS controller 118 sends a Wi-Fi signal and LF signals via the antenna modules 120 and/or the communication module 116 of the vehicle 100. At block 704, the Wi-Fi antenna 306 of the key fob 104 receives the Wi-Fi signal. At block 706, the Wi-Fi signal sent by one of the antenna modules 120 and/or the communication module 116 and received by the Wi-Fi antenna 306 energizes the electronic components 300 of the key fob 104 (e.g., the circuitry 402, the processor 302, the memory 304, the Wi-Fi antenna 306, the LF antenna 308). At block 708, the LF antenna 308 of the key fob 104 receives the LF signals sent by the antenna modules 120. At block 710, the circuitry 402 (e.g., the processor of FIG. 3) of the key fob 104 determines signal strengths (e.g., received signal strength indicators) of the LF signals. At block 712, the circuitry 402 modulates the Wi-Fi signals to include the signal strength identifiers of the LF signals. At block 714, the Wi-Fi antenna 306 sends a reflection of the Wi-Fi signal as a backscatter signal to the antenna modules 120 of the vehicle 100. At 716, the antenna modules 120 receives the Wi-Fi backscatter signal. At block 718, the communication module 122 and/or the PEPS controller 118 determines the location of the key fob 104 based upon the signal strength identifiers included in the Wi-Fi backscatter signal.

Figure 8:
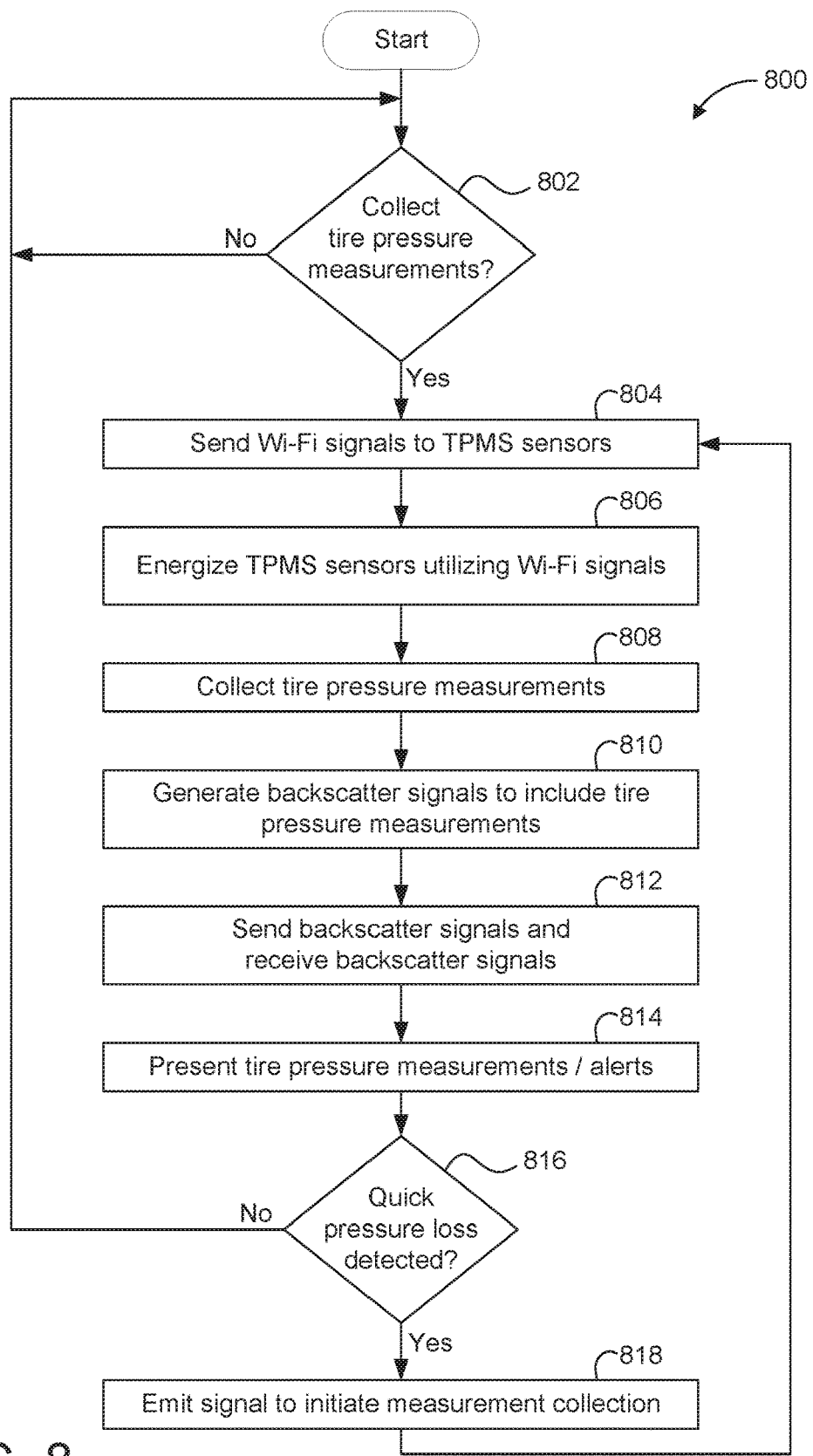
FIG. 8 is a flowchart for utilizing backscatter communication for a tire pressure monitoring system of a vehicle in accordance with the teachings herein.

FIG. 8 is a flowchart of an example method 800 to utilize backscatter communication for a tire pressure monitoring system of a vehicle. The flowchart of FIG. 8 is representative of machine readable instructions that are stored in memory (such as the memory 216 of FIG. 2) and include one or more programs which, when executed by a processor (such as the processor 214 of FIG. 2), cause the vehicle 100 to implement the example TPMS controller 128 of FIGS. 1B and 2. While the example program is described with reference to the flowchart illustrated in FIG. 8, many other methods of implementing the example TPMS controller 128 may alternatively be used. For example, the order of execution of the blocks may be rearranged, changed, eliminated, and/or combined to perform the method 800. Further, because the method 800 is disclosed in connection with the components of FIGS. 1A-4, some functions of those components will not be described in detail below.

At block 802, the TPMS controller 128 determines whether it is time to collect pressure measurements of the tires 124. For example, the TPMS controller 128 determines that is time to collect pressure measurements of the tires 124 when the TPMS system is in an active mode, an anticipated mode, and/or an on-demand mode. In response to the TPMS controller 128 determining that it is not time to collect tire pressure measurements, the method 800 remains at block 802. Otherwise, in response to the TPMS controller 128 determining that it is time to collect tire pressure measurements, the method 800 proceeds to block 804.

At block 804, the TPMS controller 128 sends Wi-Fi signals to the TPMS sensors 126 via the communication module 116 and/or the antenna modules 120. At block 806, electronic components of the TPMS sensors 126 are energized by the received Wi-Fi signals. At block 808, the TPMS sensors 126 collect the pressure measurements of the tires 124. At block 810, the TPMS sensors 126 modulate the Wi-Fi signals to include the collected tire pressure measurements. At block 812, the TPMS sensors 126 send reflections of the modulated Wi-Fi signals as backscatter signals. Further, the TPMS controller 128 receives the Wi-Fi backscatter signals that include the tire pressure measurements via the communication module 116 and/or the antenna modules 120.

At block 814, the TPMS controller 128 presents the tire pressure measurements and/or pressure alerts of the tires 124 via a display (e.g., the display 218 of the vehicle 100, a display of a mobile device of the user 102). For example, the TPMS controller 128 compares the collected tire pressure measurements to a low-pressure threshold and/or a high-pressure threshold. The TPMS controller 128 emits a low-pressure alert when at least one of the tire pressure measurements is less than the low-pressure threshold and/or a high-pressure alert when at least one of the tire pressure measurements is greater than the high-pressure threshold.

The TPMS sensors 126 also monitor for quick pressure losses (e.g., punctures) of one or more of the tires 124. At block 816, the TPMS sensors 126 detect whether a quick pressure loss is occurring. In response to the TPMS sensors 126 not detecting a quick pressure loss, the method 800 returns to block 802. Otherwise, in response to the TPMS sensors 126 detecting a quick pressure loss, the method 800 returns to block 804 to collect additional tire pressure measurements.

An example disclosed vehicle includes a communication module for Wi-Fi communication and a controller. The controller is to send a signal via the communication module upon identifying a passive-entry passive-start (PEPS) request and receive a backscatter signal from an electronic device. The backscatter signal is a reflection of the signal. The controller also is to determine a distance to the electronic device based upon the backscatter signal and perform the PEPS request upon determining the distance corresponds with the PEPS request.

In some examples, the controller is to determine the distance based upon a time-of-flight of the signal and the backscatter signal and determine whether the distance corresponds with the PEPS request by comparing the time-of-flight to an expected turnaround time for the PEPS request. In some examples, the signal sent by the communication module is configured to energize the electronic device to send the backscatter signal.

Some examples further include a door handle and a handle sensor. In such examples, the controller is to identify the PEPS request responsive to the handle sensor detecting that the door handle is engaged and determine that the distance corresponds with the PEPS request when the distance corresponds with a second distance to the door handle. In some such examples, to perform the PEPS request, the controller unlocks a door corresponding to the door handle. In some examples, the controller is to prevent performance of the PEPS request responsive to determining that the distance does not correspond with the PEPS request.

Some examples further include a plurality of Wi-Fi antennas. In such examples, the controller is to send Wi-Fi signals via the plurality of Wi-Fi antennas upon identifying the PEPS request, receive a plurality of backscatter signals from the electronic device that correspond with the Wi-Fi signals, determine a location of the electronic device based upon times-of-flight of the Wi-Fi signals and the plurality of backscatter signals, and perform the PEPS request in response to determining the distance and the location corresponds with the PEPS request.

An example disclosed system includes a vehicle. The vehicle includes a communication module to send a Wi-Fi signal and LF signals upon identifying an access request. The communication module also is to receive a backscatter signal that is a modified reflection of the Wi-Fi signal and includes signal strengths of the LF signals. The vehicle also includes a controller to determine a location of an electronic device based upon the signal strengths and enable access responsive to the location corresponding with the access request.

Some examples further include a key fob of a user of the vehicle. In such examples, the controller determines that the key fob is the electronic device responsive to determining that the location corresponds with the access request. In some such examples, the key fob includes a Wi-Fi antenna to receive the Wi-Fi signal and send the backscatter signal, a LF antenna to receive the LF signals, and circuitry to determine signal strength identifiers of the LF signals and modulate the Wi-Fi signal to include the signal strengths in the backscatter signal. Further, in some such examples, the key fob is a passive electronic device without a battery that is energized by the Wi-Fi signal to receive the LF signals, determine the signal strength identifiers, modulate the Wi-Fi signal to generate the backscatter signal, and reflect the backscatter signal. In some such examples, the key fob is credit card-shaped.

In some examples, the vehicle includes a door handle and a handle sensor. In such examples, the controller is to identify the access request responsive to the handle sensor detecting that the door handle is engaged and determine that the location corresponds with the access request when the location corresponds with a second location of the door handle. In some such examples, to perform the access request, the controller unlocks a door corresponding to the door handle. In some examples, the controller is to prevent performance of the access request responsive to determining that the location does not correspond with the access request.

An example disclosed vehicle includes tires, tire pressure monitoring system (TPMS) sensors to collect pressure measurements of the tires, a communication module for Wi-Fi communication, and a controller. The controller is to send signals via the communication module to the TPMS sensors. The controller also is to receive the backscatter signals from the TPMS sensors that are modified reflections of the signals and include the pressure measurements. The TPMS sensors modulate the signals to include the pressure measurements in the backscatter signals.

In some examples, the controller is configured to collect the pressure measurements of the tires when a TPMS system is in at least one of active mode, anticipated mode, or on-demand mode. In some examples, the signals sent by the communication module energize the TPMS sensors to collect the pressure measurements, modulate the signals to include the pressure measurements in the backscatter signals, and reflect the backscatter signals.

Some examples further include a display configured to present at least one of the pressure measurements, a low-pressure alert, and a high-pressure alert. In some examples, the controller is configured to compare the pressure measurements to a low-pressure threshold and a high-pressure threshold, emit a low-pressure alert when at least one of the pressure measurements is less than the low-pressure threshold, and emit a high-pressure alert when at least one of the pressure measurements is greater than the high-pressure threshold.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the term "module" refers to hardware with circuitry to provide communication, control and/or monitoring capabilities. A "module" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system comprising:
   a key fob configured to receive LF signals, receive a Wi-Fi signal, determine signal strength identifiers of the LF signals, modulate the Wi-Fi signal to include the signal strength identifiers of the LF signals in a backscatter signal, and send the backscatter signal; and
   a vehicle including:
      a communication module to:
         send the Wi-Fi signal and the LF signals upon identifying an access request; and
         receive the backscatter signal; and
      a controller to:
         identify the signal strength identifiers in the LF signals;
         determine a location of an electronic device based upon the signal strength identifiers; and
         enable access to the vehicle responsive to determining that the location corresponds with the access request.

2. The system of claim 1, wherein the controller determines that the key fob is the electronic device responsive to determining that the location corresponds with the access request.

3. The system of claim 2, wherein the key fob includes:
   a Wi-Fi antenna to receive the Wi-Fi signal and send the backscatter signal;
   a LF antenna to receive the LF signals; and
   circuitry to determine the signal strength identifiers of the LF signals and modulate the Wi-Fi signal to include the signal strength identifiers in the backscatter signal.

4. The system of claim 3, wherein the key fob is a passive electronic device without a battery that is energized by the Wi-Fi signal to receive the LF signals, determine the signal strength identifiers, modulate the Wi-Fi signal to generate the backscatter signal, and reflect the backscatter signal.

5. The system of claim 2, wherein the key fob is credit card-shaped.

6. The system of claim 1, wherein the vehicle includes a door handle and a handle sensor, wherein the controller is to:
   identify the access request responsive to the handle sensor detecting that the door handle is engaged; and
   determine that the location corresponds with the access request when the location corresponds with a second location of the door handle.

7. The system of claim 6, wherein, to perform the access request, the controller unlocks a door corresponding to the door handle.

8. The system of claim 1, wherein the controller is to detect a relay attack that amplified the backscatter signal responsive to determining that the location does not correspond with the access request.

9. The system of claim 8, wherein the controller is to prevent performance of the access request responsive to detecting the relay attack that amplified the backscatter signal.

10. A system comprising:
    a key fob of a user, the key fob including:
       a Wi-Fi antenna to receive a Wi-Fi signal and send a backscatter signal;

a LF antenna to receive LF signals; and circuitry to determine signal strength identifiers of the LF signals and modulate the Wi-Fi signal to include the signal strength identifiers in the backscatter signal; and a vehicle including:

a communication module to:

send the Wi-Fi signal and the LF signals upon identifying an access request; and receive the backscatter signal that is a modified reflection of the Wi-Fi signal and includes the signal strength identifiers of the LF signals; and a controller to:

determine a location of an electronic device based upon the signal strength identifiers;

determine that the key fob is the electronic device responsive to determining that the location corresponds with the access request; and enable access responsive to the location corresponding with the access request.

11. The system of claim 10, wherein the key fob is a passive electronic device without a battery that is energized by the Wi-Fi signal to:

receive the LF signals;

determine the signal strength identifiers;

modulate the Wi-Fi signal to generate the backscatter signal; and reflect the backscatter signal.

12. The system of claim 10, wherein the key fob is credit-card shaped.

13. The system of claim 10, wherein the vehicle includes a door handle and a handle sensor, wherein the controller is to:

identify the access request responsive to the handle sensor detecting that the door handle is engaged; and determine that the location corresponds with the access request when the location corresponds with a second location of the door handle.

14. The system of claim 13, wherein, to perform the access request, the controller unlocks a door corresponding to the door handle.

15. The system of claim 10, wherein the controller is to detect a relay attack that amplified the backscatter signal responsive to determining that the location does not correspond with the access request.

16. The system of claim 15, wherein the controller is to prevent performance of the access request responsive to detecting detect the relay attack that amplified the backscatter signal.

* * * * *